(12) United States Patent
Wilson, Jr. et al.

(10) Patent No.: US 6,592,075 B2
(45) Date of Patent: Jul. 15, 2003

(54) AIRCRAFT SUPPLEMENTAL AIR HEATER

(75) Inventors: Tommy M. Wilson, Jr., Stow, OH (US); William A. Beard, Uniontown, OH (US); Darryl W. Jones, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 09/932,394

(22) Filed: Aug. 17, 2001

(65) Prior Publication Data

US 2002/0056787 A1 May 16, 2002

Related U.S. Application Data

(60) Provisional application No. 60/226,199, filed on Aug. 18, 2000.

(51) Int. Cl.[7] .............................................. B64D 13/00
(52) U.S. Cl. .................................................. 244/118.5
(58) Field of Search ........................ 244/118.5; 392/379, 392/380, 392; 454/159

(56) References Cited

U.S. PATENT DOCUMENTS

| | | | | |
|---|---|---|---|---|
| 1,490,088 A | * | 4/1924 | Bridges | ....................... 219/534 |
| 3,265,865 A | * | 8/1966 | Hager, Jr. | ................... 219/549 |
| 3,662,542 A | | 5/1972 | Streb | |
| 3,775,590 A | | 11/1973 | Gartner | ....................... 219/366 |
| 3,825,212 A | | 7/1974 | Darges et al. | |
| 3,971,511 A | | 7/1976 | Casey | |
| 3,997,002 A | | 12/1976 | Baker et al. | |
| 4,220,846 A | * | 9/1980 | Rice et al. | ................... 252/502 |
| 4,272,668 A | | 6/1981 | Johnson et al. | ............. 219/375 |
| 4,334,350 A | | 6/1982 | Rice et al. | ..................... 29/611 |
| 4,461,155 A | | 7/1984 | Werjefelt | |
| 4,735,002 A | * | 4/1988 | Rath | .............................. 34/97 |
| 4,857,707 A | * | 8/1989 | Dall | ........................... 219/523 |
| 4,893,748 A | | 1/1990 | Balducci | |
| 5,157,850 A | * | 10/1992 | Terng-Shuh | ................. 34/202 |
| 5,212,763 A | * | 5/1993 | Arold et al. | ................ 219/502 |
| 5,382,774 A | | 1/1995 | Bruck et al. | ................ 219/553 |
| 5,396,699 A | * | 3/1995 | Mauduit | ..................... 156/187 |
| 5,562,263 A | | 10/1996 | Wagner | |

FOREIGN PATENT DOCUMENTS

| | | | | |
|---|---|---|---|---|
| EP | 0 595 076 A | | 5/1994 | ........... H05B/3/12 |
| JP | 354115440 A | * | 9/1979 | ................ 392/360 |

OTHER PUBLICATIONS

International Search Report (PCT/ISA/210).

* cited by examiner

Primary Examiner—Peter M. Poon
Assistant Examiner—Timothy D. Collins
(74) Attorney, Agent, or Firm—Renner, Otto, Boisselle & Sklar, LLP

(57) ABSTRACT

An aircraft supplemental air heater including a coiled composite having a series of passes defining a spiral shaped airflow passage therebetween. The composite includes a heating element that provides a controlled heat output when a voltage potential is applied across it. The composite also includes a convective heat transfer surface to which the heat output is transferred whereby as air flows through the heater's spiral shaped airflow passage, it passes over the convective heat transfer surface and heat is thereby transferred to the air through convection. The aircraft supplemental air heater maybe installed in-line with an air supply duct leading to the cabin of the aircraft and/or may be installed downstream of a fan. The heater may be made by assembling a composite panel and then forming this panel into the desired coiled shape.

38 Claims, 6 Drawing Sheets

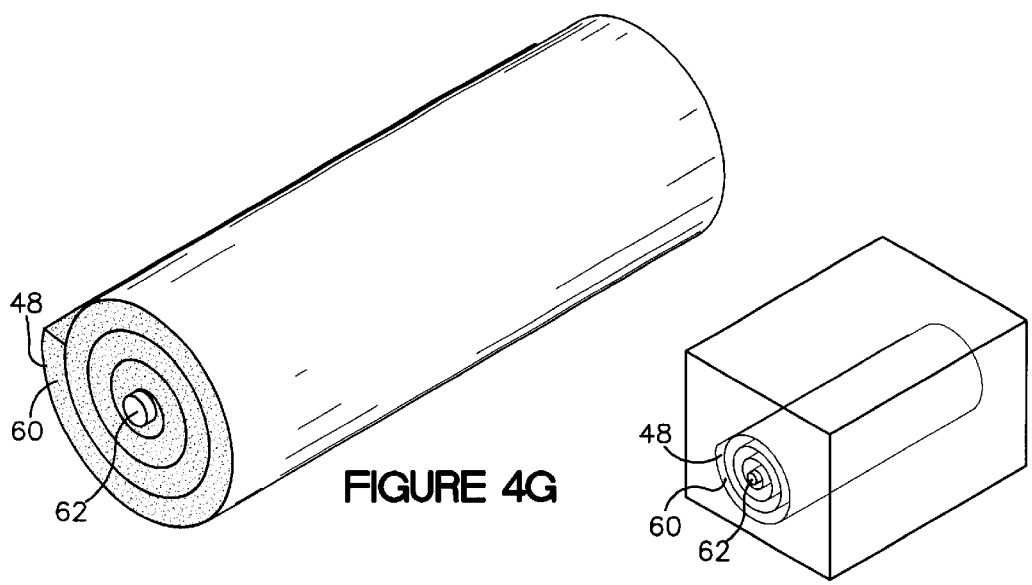
FIGURE 4G
FIGURE 4H
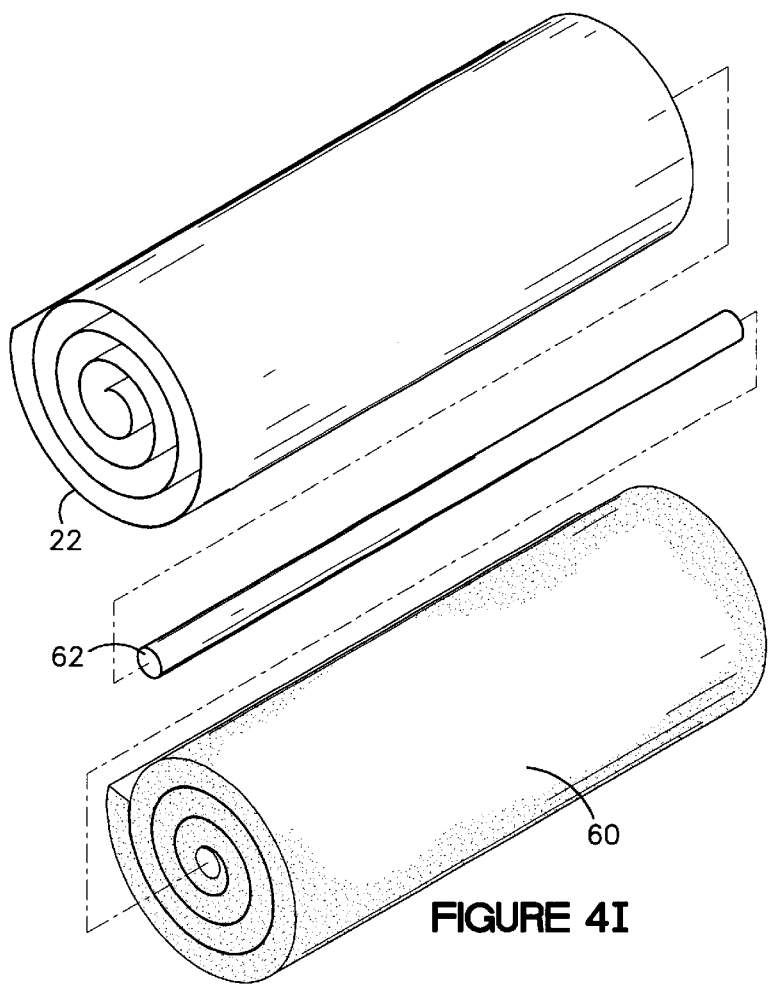
FIGURE 4I

AIRCRAFT SUPPLEMENTAL AIR HEATER

RELATED APPLICATIONS

This application claims priority under 35 U.S.C. § 119(e) to U.S. Provisional Application No. 60/226,199 filed on Aug. 18, 2000. The entire disclosure of this earlier provisional application is hereby incorporated by reference.

FIELD OF THE INVENTION

This invention relates generally as indicated to an aircraft supplemental air heater and, more particularly, to an air heater wherein a composite containing the heating element has a coiled construction and a spiral-shaped air passage is provided for convective heat transfer.

BACKGROUND OF THE INVENTION

An aircraft, such as a commercial plane, conventionally has a heating system for climate control of cabin air. This heating system comprises, for example, a heat exchanger which uses warm engine exhaust gas to heat cabin air and this heated air is then supplied to the cabin through a series of air ducts. While such a heating system usually provides sufficient heat for a majority of areas on the aircraft, there are usually still some "cold areas" which require supplemental heat. These cold areas include, for example, lavatories, certain passenger seats (such as the ones adjacent emergency exit doors), the cockpit, the cargo bay, and other areas. Supplemental air heaters may be required on the aircraft to maintain desired thermal conditions for the aircraft's crew, passengers and/or equipment in these cold areas. Typically, a supplemental aircraft air heater is installed in-line with a cabin air supply duct and/or downstream of a fan providing a forced airstream.

An aircraft supplemental air heater may comprise an outer shell and a heating element within the shell. Typically, the heating element is insulated and bonded to one side of a flat carrier plate or contained within a carrier plate. The electrical heating element provides a heat output when a voltage potential is applied across it and the heat output is transferred to the flat carrier plate. The carrier plate is positioned within the shell in an orientation parallel to the airflow direction so that as the cabin air flows through the heater's shell, it passes over the heater plate and heat is thereby convectively transferred to the air.

An aircraft supplemental air heater having a flat carrier plate will usually perform sufficiently well in many situations, however, some issues are created in circumstances requiring higher heat output. Specifically, to satisfy higher heat output demands, the aircraft supplemental air heater may need to incorporate a plurality of heater plates to increase the convective heat transfer surface. When a plurality of heater plates are used, they are usually placed in parallel or in series with each other. In any event, the introduction of multiple heater plates usually increases production costs and complicates assembly, installation and wiring procedures. Additionally or alternatively, the increased power density required by the multiple heater plates elevates operating temperatures and reduces heater life.

SUMMARY OF THE INVENTION

The present invention provides a lightweight supplemental air heater for an aircraft. More particularly, the present invention provides an aircraft supplemental air heater comprising a coiled composite defining a spiral shaped airflow passage. The coiled composite includes a heating element that is configured to operate at different voltages and/or may be configured to operate in multi-phase AC systems. If the heating element comprises an etched metal layer, it may comprise a plurality of different heating circuits. In any event, the heating element provides a controlled heat output when a voltage potential is applied across it. The composite also includes a convective heat transfer surface to which the heat output is transferred whereby as air flows through the heater's spiral shaped airflow passage, it passes over the convective heat transfer surface and heat is thereby transferred to the air through convection.

An aircraft supplemental air heater according to the present invention may be constructed so that the radial dimension of the coil is between 0.2" and 1.0". The spiral-shaped passage may comprise a central substantially cylindrical passageway, coil-shaped passageways between radially adjacent coil passes and an outer passageway surrounding an outer coil pass. The separation in the radial direction between adjacent coil passes may remain substantially constant whereby the radial dimension of the coil-shaped passageways will be approximately the same along the radial dimension of the coiled composite. Alternatively, the separation in the radial direction between adjacent coil passes may change between coil passes whereby the radial dimension of the coil-shaped passageways will vary along the radial dimension of the composite.

The aircraft supplemental air heater may be installed in-line with an air supply duct leading to the cabin of the aircraft. If so, the coiled composite may be positioned approximately concentrically within a shell having a size and shape corresponding to the air supply duct. Additionally or alternatively, the aircraft supplemental air heater may be installed downstream of a fan. If the fan creates an airflow profile in which the fluid velocity decreases in the radially inward direction, the heater may be constructed so that the radial separation between adjacent coil passes is greater at radially center passageways than radially outer passageways. In this manner, slower moving portions of the airstream's velocity profile will be provided with wider passageways through the heater. Alternatively, the density of the heating element(s) may be varied in relation to the airstream's velocity profile.

To make an aircraft supplemental air heater according to the present invention, a flat composite panel is assembled and then this panel is formed into the desired coiled shape. The panel initially has a length corresponding to the desired length of the element, a width corresponding to the desired number of coil passes and the desired radial dimensions of the air passageways, and a thickness corresponding to the desired radial dimension of the coil passes.

The composite panel may be compiled from a metal foil layer which is processed to form the heating element, insulation layers which form the insulation strata, and a carrier layer which forms the carrier sheet. In this compilation, for example, the metal foil layer is bonded to one of the insulating layers and the desired conductive paths are etched in the metal foil layer. The etched foil layer is then covered with the other insulating layer and the carrier sheet is secured thereto to form the composite panel.

The panel may be formed into the coiled shape by placing a spacer on the composite panel, winding the panel/spacer into a coiled shape, curing the coiled panel/spacer so that it maintains the coiled shape, and removing the spacer. The spacer has a thickness corresponding to the desired separation between the coil passes in the completed heater. If the spacer comprises a spacer layer, this layer may have substantially the same thickness across its width/length to provide substantially the same radial dimension between the coil passes or this layer may have a varying thickness to provide differential radial dimensions between the coil passes. The spacer may also comprise a spacer element which is shaped and sized to correspond to the desired central passageway of the heater.

The coiled construction of the composite and other features of the air heater provides advantages over conventional air heaters which often must include several carrier plates to satisfy higher heat output requirements. In comparison to these multi-plate heaters, the heater according to the present invention is economically produced, quickly assembled, efficiently installed, easily wired, and provides increased reliability. As a result of some or all of these advantages, local power density can be reduced thereby lowering operating temperatures and prolonging heater life. Also, the heater of the present invention may be constructed so that its air passage compensates for a fan-induced flow profile, a compensation that is not so easily accomplished with conventional air heaters having multiple carrier plates.

These and other features of the invention are fully described and particularly pointed out in the claims. The following descriptive annexed drawings set forth in detail certain illustrative embodiments of the invention, these embodiments being indicative of but a few of the various ways in which the principles of the invention may be employed.

DRAWINGS

FIGS. 4A–4K are schematic view of the steps in a method for making the air heater.

DETAILED DESCRIPTION

Figure 1:
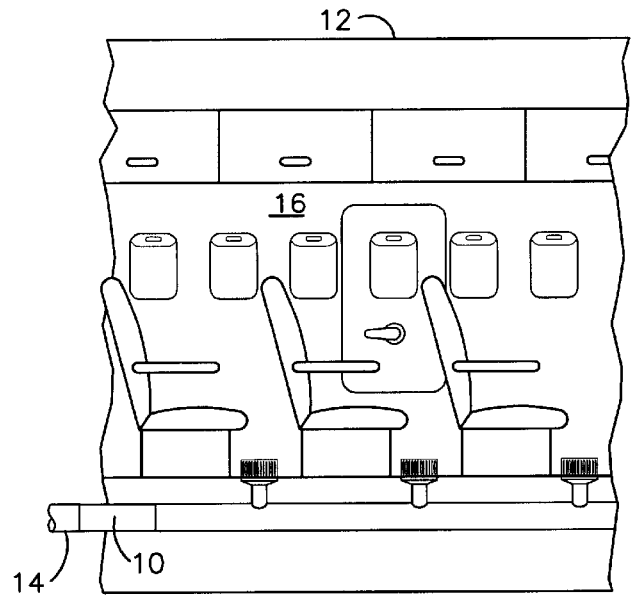
FIG. 1 is a perspective view of an aircraft supplemental air heater according to the present invention, the air heater being shown installed in-line with an air duct on an aircraft.

Referring now to the drawings, and initially to FIG. 1, an air heater 10 according to the present invention is shown installed on an aircraft 12. More particularly, the air heater 10 is shown installed in-line with an air supply duct 14 leading to the cabin 16 of the aircraft 12. As cabin air flows through the air duct 14, it passes through the heater 10 and heat is thereby transferred to the air through convection. The heated air is exhausted to the cabin 16 to maintain desired thermal conditions for the aircraft's crew, passengers and/or equipment in certain cold areas of the cabin. These cold areas could include, for example, lavatories, certain passenger seats, the cockpit, the cargo bay, and other areas. In the illustrated embodiment, the air heater 10 is installed in an air duct 14 near passenger seats adjacent an emergency exit.

Figure 2:
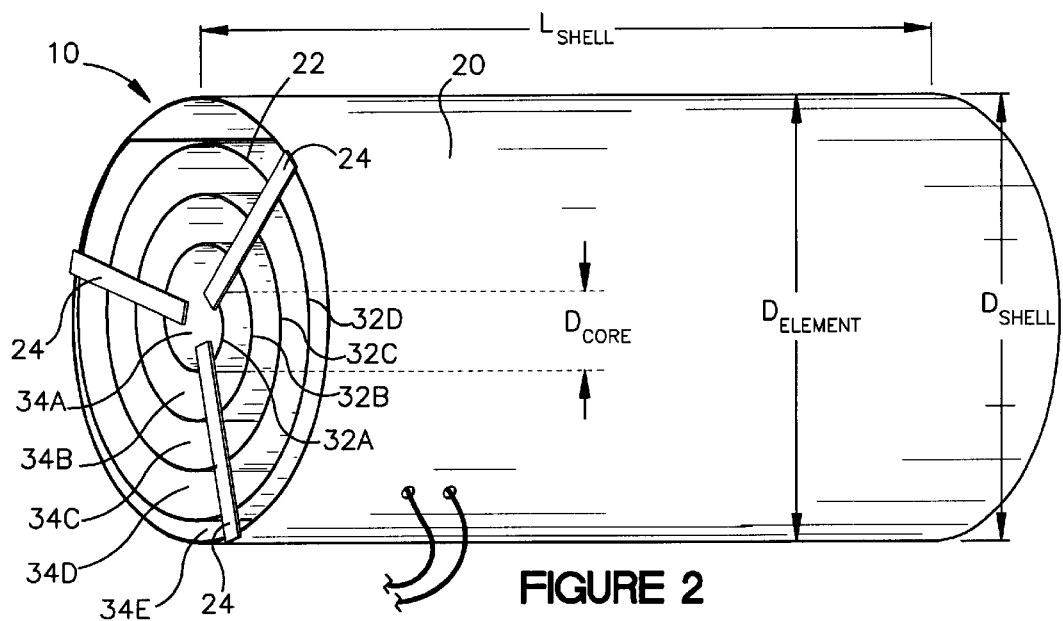
FIG. 2 is an isolated view of the air heater.

Referring now to FIG. 2, the air heater 10 is shown isolated from the rest of the aircraft 12. The heater 10 comprises an outer shell 20, a heating composite 22, and mounting brackets 24. The illustrated outer shell 20 is cylindrical or tubular in shape, and has a length $L_{shell}$ and a diameter $D_{shell}$. Typically, these length and diameter dimensions would correspond to the dimensions of the air duct 14 (FIG. 1) for the in-line installation of the air heater 10.

The composite 22 has a spiral or coil shape having a series of passes 32A–32D. The coiled composite 22 has a length $L_{element}$ (approximately the same as the length $L_{shell}$ of the shell 20 in the illustrated embodiment), a central core diameter $D_{core}$, and an outer diameter $D_{element}$. In the illustrated embodiment, the composite 22 includes four passes, however, a heater having as few as two passes and as many as fifty passes is possible with, and contemplated by, the present invention.

The radial separation or distance between the passes 32 forms a spiral-shaped air-flow passage 34 through the heater 10. This passage 34 is formed by a central substantially cylindrical passageway 34A, coil-shaped passageways 34B, 34C and 34D between radially adjacent coil passes 32A/32B, 32B/32C and 32C/32D respectively, and an outer coil-shaped passageway 34E surrounding the outer coil 32D. In the illustrated embodiment of the heater 10, the radial separation between adjacent coil passes 32 remains substantially constant whereby the radial dimension of the passageways 34B–34E is approximately the same.

The spiral-shaped heater composite 22 is approximately concentrically positioned within the shell 20 and secured thereto by the brackets 24. The brackets 24 may support the coiled composite 22 at each axial end, as shown, and/or may intermediately support the composite 22 by passing through appropriately placed slots (not shown). The brackets 24 may also serve to maintain the desired separation of the coil passes 32. When the air heater 10 is installed in-line with the air duct 14 (FIG. 1), the coil passes 32 and the passageways 34 are aligned with the air flow direction through the duct.

Figure 3:
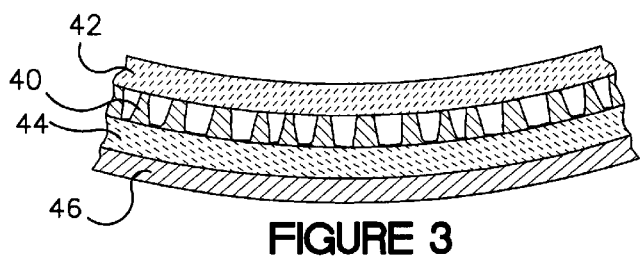
FIG. 3 is a enlarged sectional view of a portion of the air heater.

Referring now additionally to FIG. 3, an enlarged sectional portion of the coiled composite 22 is illustrated. As shown, the illustrated composite 22 comprises an electrical heating element 40, insulation strata 42 and 44, and a carrier sheet 46. The heating element 40 is sandwiched between the insulation strata 42 and 44 and supported on the carrier sheet 46. Although the illustrated embodiment of the invention shows one carrier sheet 46, a coiled composite having dual carrier sheets (one on both sides) or coiled composite without a carrier sheet 46 is possible with, and contemplated by, the present invention During operation of the air heater 10, the heating element 40 provides a controlled heat output when a voltage potential is applied across it. To this end, the heating element 40 may be configured to operate at different voltages or in commonly used multi-phase AC systems. In any event, the insulation strata 42 and 44 electrically insulates the heating element 40 while at the same time allowing the transfer of the electrically generated heat output therethrough. The heat is transferred to the insulation strata 42 and the carrier sheet 46 which form the convective heat transfer surfaces of the heater composite 22. As the air flows through the heater's coiled passage 34, it passes over these surfaces 42 and 46 and heat is thereby transferred to the air through convection. It may be noted that if the heating element 40 does not include a carrier sheet, the insulation strata 44 would form a convective heat transfer surface. Also, if the heating element 40 includes another carrier sheet adjacent the insulation strata 42, this second carrier sheet would instead form the convective heat transfer surface.

The heating element 40 may comprise an etched metal layer, such as etched 302 stainless steel, Inconel 600, copper alloy, constantan, or any other suitable electrically conductive material. An advantage of using an etched metal layer is that a number of heating circuits may be provided. That being said, resistance wire may be used instead to form the heating element 40. The insulation strata 42 and 44 may comprise any suitable material providing the desired electrical insulation and thermal conductivity characteristics, for example, fiberglass/epoxy, fiberglass/silicone or Kapton™, and the two insulation strata may be of the same or different materials. The carrier sheet 46 may comprise any material providing the desired support and convective heat transfer characteristics. Suitable carrier materials include, for example, stainless steel, copper, copper alloy or aluminum.

The coiled construction of the composite 22 allows for a compact and lightweight heater construction. For example, for a 6000 KW heater, the thickness (or radial dimension) of the heating element 40 could be in the range of 0.0005–0.008 inch if an etched metal layer is used and in the range of 0.005–0.030 inch if resistance wire is used. With such a heating element 40, the thickness of each of the insulation strata 42 and 44 could be in the range of 0.004–0.040 inch. More specifically, a fiberglass/epoxy layer having an 0.010 to 0.020 inch thickness would be appropriate, a fiberglass/silicone layer having an 0.020 to 0.030 inch thickness would be appropriate, and/or a Kapton™ layer having an 0.005–0.009 inch thickness would be appropriate. The thickness of the carrier sheet 46 could be in the range of 0.002–0.040 inch, such as a 0.005 inch stainless steel sheet, a 0.005 inch copper or copper alloy sheet, or 0.20 inch aluminum sheet. These radial dimensions of the heating element 40, the insulation strata 42 and 44, and the carrier sheet 46 would result in the thickness or radial dimension of the coil passes 32 of the heating element 22 would be in the range of 0.010–0.070 inch.

Referring now to FIGS. 4A–4K, a method for making the air heater 10 is schematically shown. In the illustrated method, a panel 48 is formed and then coiled into the desired shape to form the coiled composite 22. The flat planar panel 48 has a length $L_{panel}$ corresponding to the desired length $L_{element}$ of the coiled composite 22, a width $W_{panel}$ corresponding to the desired number of coil passes 32 and the desired radial dimensions of the air passageways 34, and a thickness $T_{panel}$ corresponding to the desired radial dimension of the coil passes 32. The panel 48 is made of a plurality of layers, namely a metal foil layer 50, insulating layers 52 and 54, and a carrier layer 56, which are compiled, assembled, and/or processed to form the panel 48. In the illustrated method, the layers each initially have a flat planar shape and each have approximately the same length and width as the panel 48.

In initial production steps, the foil layer 50 is etched to form the electrical heating element(s) 40 whereby it is made of the desired circuitry material and is of a thickness which will provide the desired post-etching thickness. The insulating layers 52 and 54 form the insulation strata 42 and 44 in the completed composite 22 and thus are made of the desired insulation strata material and are of the desired insulation thickness. The carrier layer 56 forms the carrier sheet 46 in the composite 22, so it is likewise made of the desired carrier material and the desired carrier thickness. The layers should be thick enough to perform their appointed functions in the completed air heater 10, while at the same time being thin enough to provide sufficient flexibility for the shaping of the panel 48 into the coiled construction in later method steps.

Figure 4A:
Figure 4B:
Figure 4C:
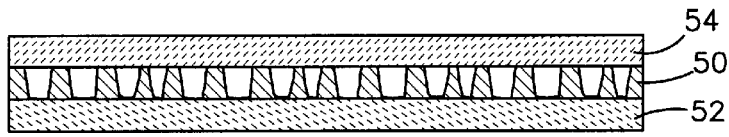
Figure 4D:
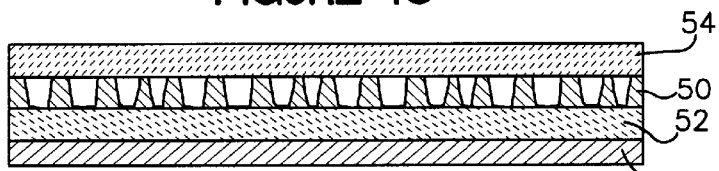

In the illustrated method of making the heater 10, the foil layer 50 is bonded to the insulating layer 52. (FIG. 4A.) The foil layer 50 is then etched by a chemical process that removes material between desired conductive paths corresponding to the heating element(s) 40. (FIG. 4B.) The etched foil layer 50 is then covered with the insulating layer 54 whereby the etched foil layer 50 is positioned between the insulating layers 52 and 54. (FIG. 4C.) The covered etched foil layer 50 is then secured to the carrier layer 56 to form the panel 48. (FIG. 4D.)

Figure 4E:
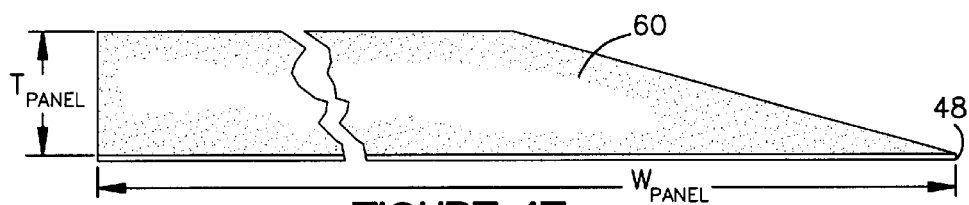
Figure 4F:
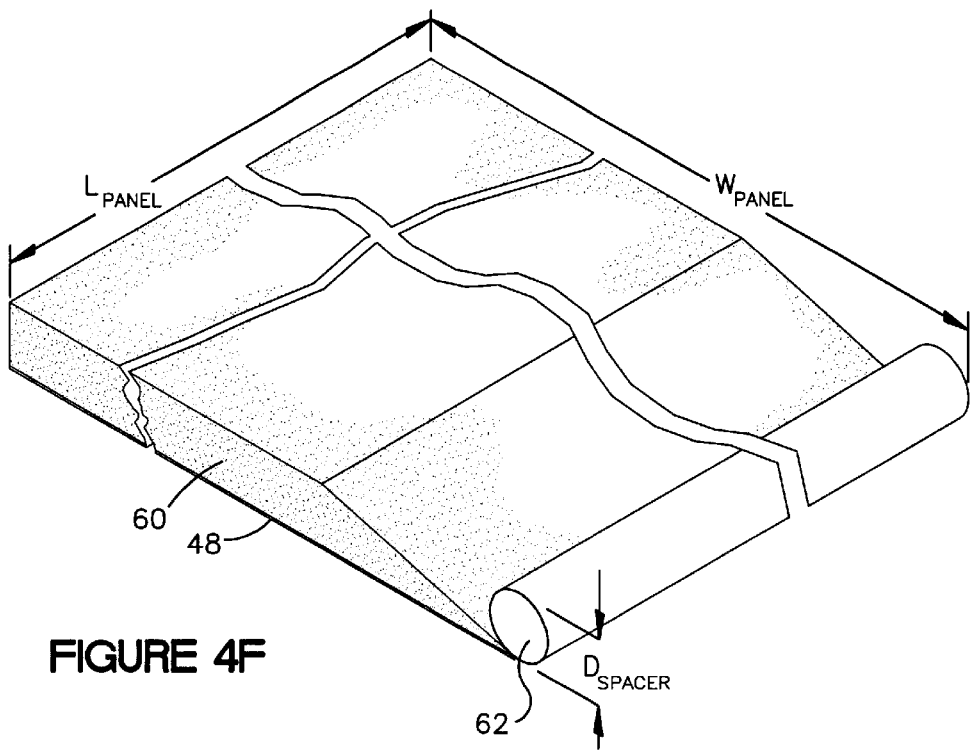

A spacer layer 60 is then placed over the insulating layer which is not directly secured to the carrier layer 56, which is the insulating layer 54 in the illustrated embodiment. (FIG. 4E.) A spacer cylinder 62 is then positioned at the leading lateral edge of the spacer layer 60. (FIG. 4F.) If desired, and as illustrated, the spacer layer 60 may have a sloped leading edge to accommodate the spacer cylinder 62. In any event, the thickness $T_{spacer}$ of the spacer layer 60 corresponds to the desired separation between the coil passes 32 in the completed heater 10 whereby a spacer layer 60 having a substantially constant thickness is used. The diameter $D_{spacer}$ of the spacer cylinder 62 corresponds to the desired core diameter $D_{core}$ of the coiled composite 22. As will soon become apparent, the spacer layer 60 and the spacer cylinder 62 are only used during certain intermediate method steps and are not present in the final coiled composite 22. To this end, these spacing components are made of a material that is compatible with the bending, curing and/or other intermediate assembling or processing steps which are performed to place the panel 48 into the desired coiled shape. Suitable materials would include, for example, silicone sponge, silicone sheet rubber or fabrics treated with non-adhesive coatings.

Figure 4J:
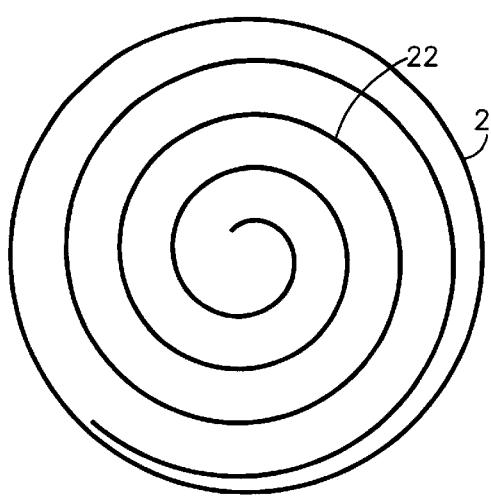
Figure 4K:
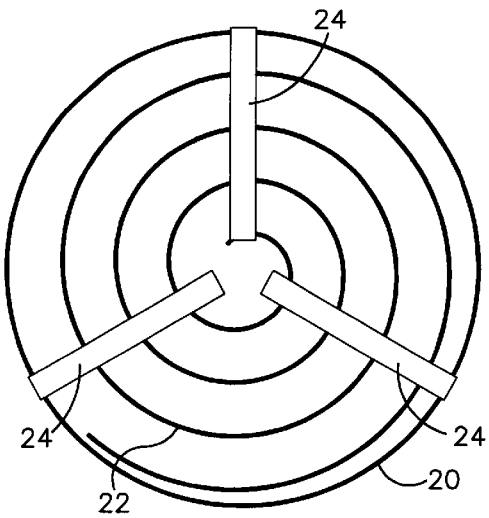

The panel 48 and the spacer layer 60 are wound around the spacer cylinder 62 to form the desired coiled configuration. (FIG. 4G.) The coiled panel 48 and spacers 60/62 are then vacuum bagged and cured in an oven or autoclave. (FIG. 4H.) After the curing step, the spacer layer 60 and the spacer cylinder 62 are removed thereby forming the coiled composite 22. (FIG. 4I.) The coiled composite 22 is then placed within the shell 20. (FIG. 4J.) The brackets 26 are used to secure the composite 22 to the shell 20 to complete the assembly of the air heater 10. (FIG. 4K.)

Figure 5A:
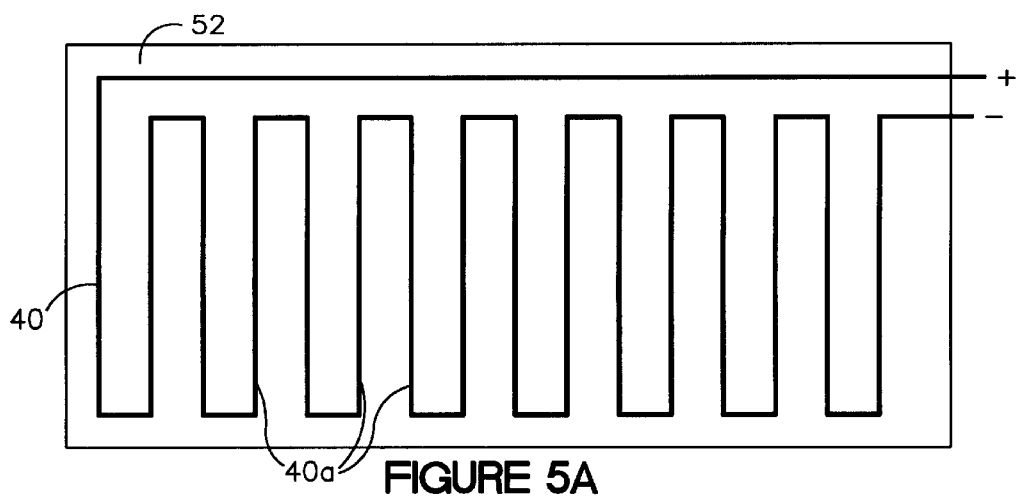
FIGS. 5A, 5B and 5C are schematic plan views of an etched layer formed during the step shown in FIG. 4B.
Figure 5B:
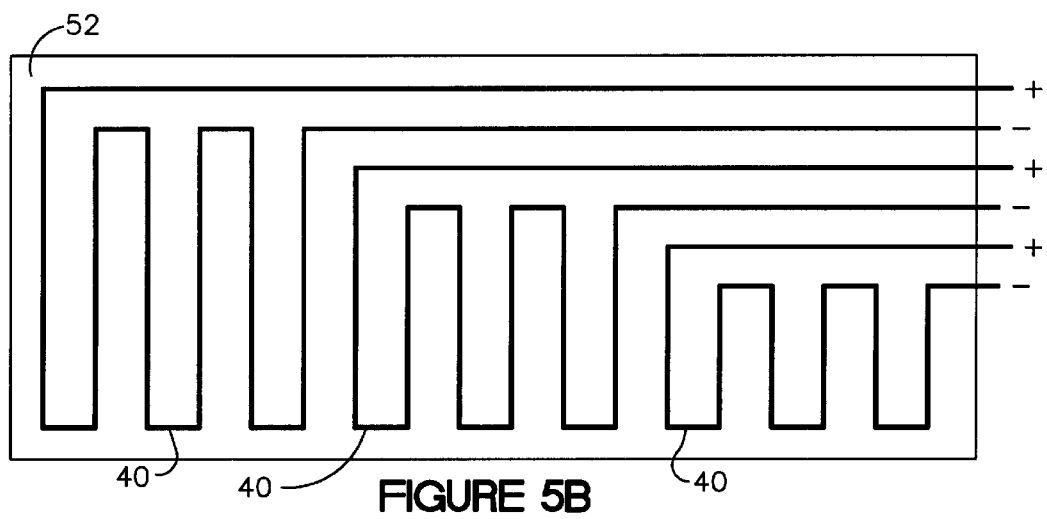

Referring briefly back to the step shown in FIG. 4B, wherein the foil layer 50 is etched by a chemical process to form conductive paths corresponding to the heating element(s) 40, one advantage of the present invention is that a variety of heating element designs may be incorporated into the heater. For example, the etching may be performed so that a single heating element 40 is the same, with the density of the heating sub-elements 40a being substantially the same along the length of the layer 52. (See FIG. 5A.) The etching may be performed so that a plurality of heating elements 40 are formed on the layer 52. (See FIG. 5B.) The etching may be formed so that the density of the sub-elements 40a varies along the length of the layer 52. (See FIG. 5C.)

Figure 6:
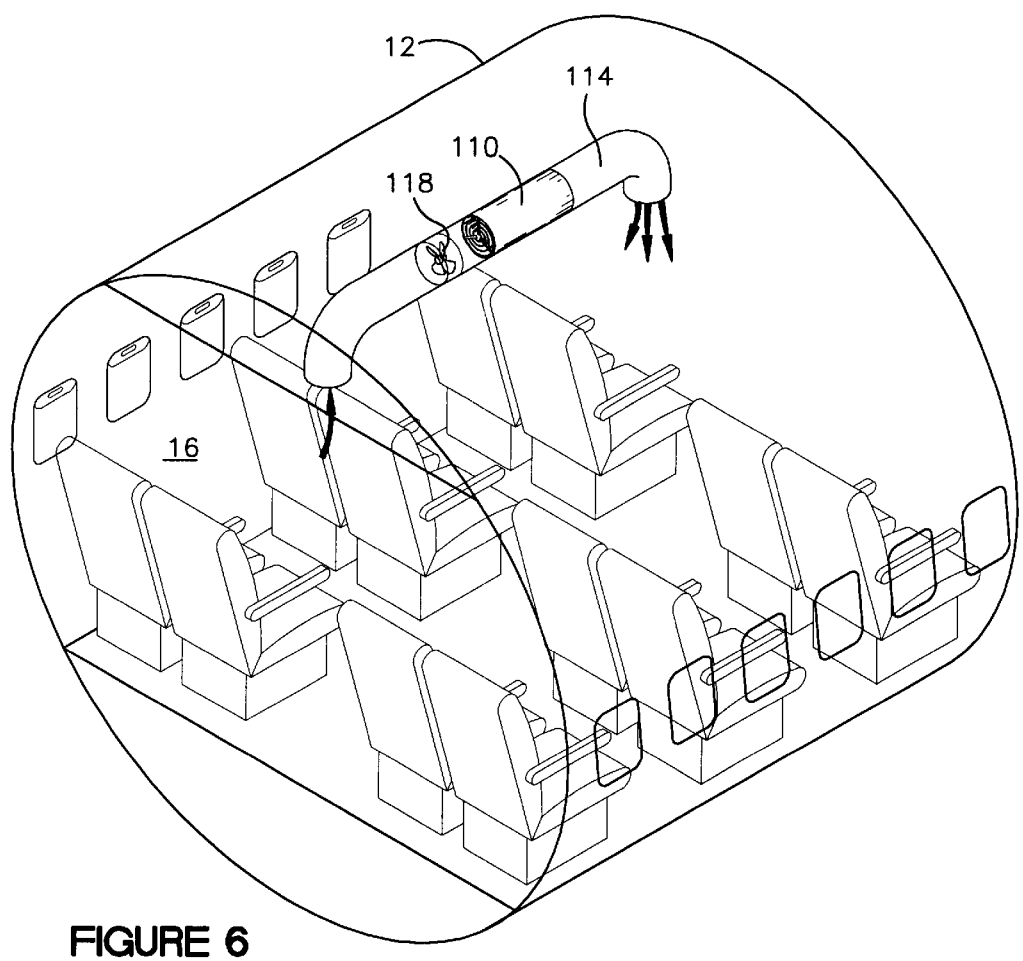
FIG. 6 is a perspective view of another aircraft supplemental air heater according to the present invention, this air heater being shown installed downstream of a fan.

Referring now to FIG. 6, another air heater 110 according to the present invention is shown installed on the aircraft 12 downstream of a fan 118. As the fan-forced air flow passes through the heater 110, heat is thereby transferred to the air through convection. The heated air is exhausted to a cold area of the aircraft 12. In the illustrated embodiment, the fan 118 is positioned within an air duct or other type of conduit 114. However, the heater 110 may be without an air duct or conduit.

Figure 7:
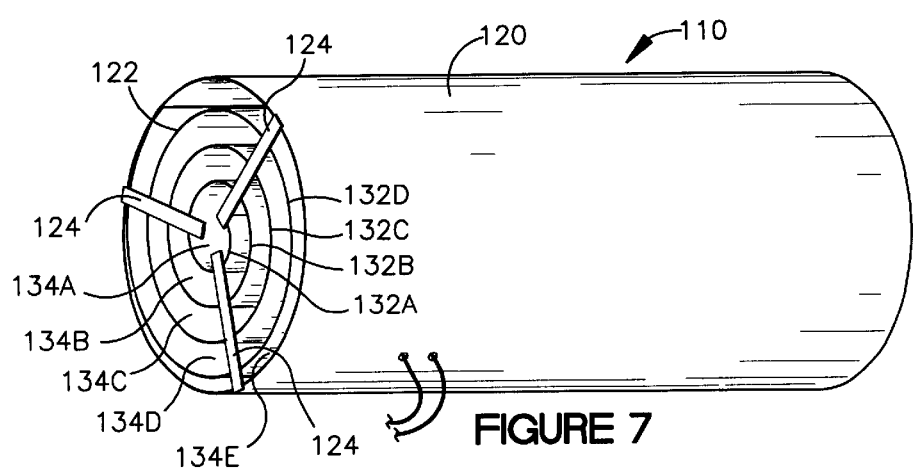
FIG. 7 is an isolated view of the air heater of FIG. 6.

Referring additionally to FIG. 7, the heater 110 is illustrated isolated from the rest of the aircraft 12. The construction of the heater 110 is similar to the construction of the heater 10 and includes an outer shell 120, a coiled composite 122, and mounting brackets 124. The dimensions of the shell (length $L_{shell}$ and diameter $D_{shell}$) correspond to the expected exhaust profile of the fan 118 shown in FIG. 2.

The composite 122 comprises a series of coil passes 132 which forms a spiral-shaped air-flow passage 134 through the heater 110. As with the passage 34, the passage 134 is formed by a central substantially cylindrical passageway 134A, coil-shaped passageways 134B, 134C and 134D between radially adjacent coil passes 132A/132B, 132B/132C and 132C/132D respectively, and an outer coil-shaped passageway 134E surrounding the outer coil pass 132D. Each of the coil passes 132 comprises electrical heating circuitry, insulation strata, and a carrier sheet which may be the same as the analogous components discussed above in connection with the coil passes 32 of the composite 22.

Figure 5C:
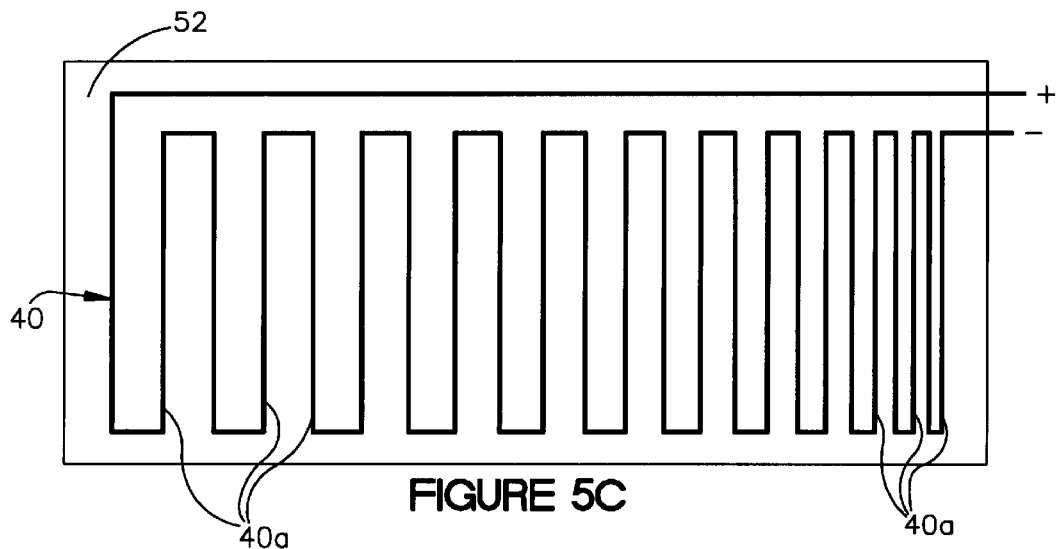

The difference between the heater 10 and the heater 110 is the spacing of the coil passes 32/132. In the heater 10, the radial dimension of the passageways 34A–34E is approximately the same. However, in the heater 110, the radial dimension of the passageways 34 is greater at the center passageways than the outer passageways. This spacing differential is provided to compensate for the fan-induced velocity profile of the airstream. Specifically, the type of fans used for aircraft purposes (such as the fan 118) sometimes create an airflow profile wherein the fluid velocity decreases in the radially inward direction. The illustrated construction of the heater 110 provides the slower moving portion of the airstream's velocity profile with wider passageways through the heater 110. Additionally or alternatively, the density of the heating element(s) 40 could be varied along the coil passes, such as is shown in FIG. 5C, to compensate for different airflow profiles.

Figure 8:
FIG. 8 is a schematic view of a modified step in the method for making the air heater of FIGS. 7 and 8.

The air heater 110 and/or the coiled composite 122 may be made in the same manner as the air heater 10 and/or the heating element 122. However, as shown in FIG. 8, a spacer layer 160 having a variable thickness is used. In the illustrated embodiment, the thickness of the spacer layer 160 decreases approximately linearly from the layer's leading lateral edge to the opposite lateral edge thereby providing the desired spacing differential between the inner coil passes and the outer coil passes to compensate for the fan-induced velocity profile of the airstream. Other space-differential providing constructions, such as a stepped or curved contour, are possible with and contemplated by the present invention.

One may now appreciate that the present invention provides a lightweight supplemental air heater for an aircraft. The coiled construction of the composite 22/122 and other features of the air heater 10/110 provides many advantages over conventional air heaters which often must include several heater plates to satisfy heat output requirements. In comparison to these heaters, the heater 10/110 is economically produced, quickly assembled, efficiently installed, easily wired, and provide increased reliability. As a result of some or all of these advantages, power density can be reduced thereby lowering operating temperatures and prolonging heater life. Also, the air passageway and/or heater element density maybe designed to compensate for a fan-induced flow profile, a compensation that is not easily accomplished with conventional air heaters having plate heating elements.

Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. An aircraft supplemental air heater comprising a coiled composite having a series of coil passes defining a spiral shaped airflow passage therebetween;
   the composite including a heating element providing a controlled heat output when a voltage potential is applied across it;
   the composite also including within insulation stratum between which the heating element is positioned; and
   the composite further including convective heat transfer surfaces to which the heat output is transferred whereby as air flows through the heater's spiral shaped airflow passage, it passes over the convective heat transfer surface and heat is thereby transferred to the air through convection.

2. An aircraft supplemental air heater as set forth in claim 1, wherein the radial dimension of the coil passes is between 0.20–1.00 inches.

3. An aircraft supplemental air heater as set forth in claim 1, wherein the spiral-shaped passage comprises coil-shaped passageways between radially adjacent coil passes and an outer passageway surrounding an outer coil pass.

4. An aircraft supplemental air heater as set forth in claim 3, wherein the spiral-shaped passage further comprises a central substantially cylindrical passageway.

5. An aircraft supplemental air heater as set forth in claim 3, wherein the radial separation between adjacent coil passes remains substantially constant whereby the radial dimension of the coil-shaped passageways is approximately the same along the radial dimension of the heating element.

6. An aircraft supplemental air heater as set forth in claim 3, wherein the radial separation between adjacent coil passes changes between coil passes whereby the radial dimension of the coil-shaped passageways varies along the radial dimension of the composite.

7. An aircraft supplemental air heater as set forth in claim 6, wherein the radial separation between adjacent coil passes is greater at radially center passageways than radially outer passageways.

8. In combination, an aircraft and an aircraft supplemental air heater as set forth in claim 7, wherein the air heater is installed downstream of a fan that creates an airflow profile in which the fluid velocity decreases in the radially inward direction whereby slower moving portions of the airstream's velocity profile are provided with wider passageways through the heater.

9. An aircraft supplemental air heater as set forth in claim 1, wherein the heating element is configured to operate at different voltages.

10. An aircraft supplemental air heater as set forth in claim 1, wherein the heating element is configured to operate in multi-phase AC systems.

11. An aircraft supplemental air heater as set forth in claim 1, wherein the composite includes a plurality of heating elements.

12. An aircraft supplemental air heater as set forth in claim 1, wherein the heating element has sub-elements arranged in a substantially constant density.

13. An aircraft supplemental air heater as set forth in claim 1, wherein the heating element has sub-elements arranged in a varying density.

14. A method of making the aircraft supplemental air heater of claim 1, said method comprising the steps of:
   assembling a flat panel including the heating element, the panel having a length corresponding to a desired length of the composite, a width corresponding to the desired number of passes in the coil and the desired radial dimensions of the air passageways, and a thickness corresponding to the desired radial dimension of the coil passes;

forming the panel into a coiled shape.

15. A method as set forth in claim 14, wherein the step of forming the panel into the coiled shape comprises:

placing a spacer on the panel, the spacer having a thickness corresponding to the desired separation between the coil passes in the completed heater; and winding the panel and spacer into a coiled shape;

curing the panel so that it maintains the coiled shape; and removing the spacer.

16. A method as set forth in claim 15, wherein said spacer comprises a spacer layer.

17. A method as set forth in claim 16, wherein the spacer layer has substantially the same thickness to provide substantially the same radial dimension between the coil passes.

18. A method as set forth in claim 17, wherein the spacer layer has a changing thickness to vary the radial dimension between the coil passes.

19. A method as set forth in claim 16, wherein the spacer also comprises a spacer element which is shaped and sized to correspond to a desired central passageway of the composite.

20. An aircraft supplemental air heater as set forth in claim 1, wherein the radial dimension of the coil passes is between 0.20–1.00 inches and wherein the heating element comprises an etched metal layer.

21. An aircraft supplemental air heater as set forth in claim 1, wherein the radial dimension of the coil passes is between 0.20–1.00 inches and wherein resistance wire is used to form the heating element.

22. An aircraft supplemental air heater comprising a coiled composite having a series of coil passes defining a spiral shaped airflow passage therebetween;

the composite including a heating element providing a controlled heat output when a voltage potential is applied across it;

the composite also including convective heat transfer surfaces to which the heat output is transferred whereby as air flows through the heater's spiral shaped airflow passage, it passes over the convective heat transfer surface and heat is thereby transferred to the air through convection; and the heating element comprising an etched metal layer.

23. An aircraft supplemental air heater comprising a shell and a coiled composite having a series of coil passes defining a spiral shaped airflow passage therebetween;

the composite including a heating element providing a controlled heat output when a voltage potential is applied across it;

the composite also including within insulation stratum between which the heating element is positioned; and the composite further including convective heat transfer surfaces to which the heat output is transferred whereby, as air flows through the heater's spiral shaped airflow passage, it passes over the convective heat transfer surface and heat is thereby transferred to the air through convection;

and wherein the coiled composite is approximately concentrically positioned within the shell.

24. In combination, an aircraft and an aircraft supplemental air heater as set forth in claim 23, wherein the air heater is installed in-line with an air supply duct leading to a cabin of the aircraft and wherein the outer shell has dimensions corresponding to the dimensions of the air supply duct.

25. An aircraft supplemental air heater comprising a coiled composite having a series of coil passes defining a spiral shaped airflow passage therebetween;

the composite including a heating element providing a controlled heat output when a voltage potential is applied across it;

the composite also including convective heat transfer surfaces to which the heat output is transferred whereby as air flows through the heater's spiral shaped airflow passage, it passes over the convective heat transfer surface and heat is thereby transferred to the air through convection; and the composite further including within insulation stratum, at least one of which forms at least part of the convective heat transfer surface.

26. An aircraft supplemental air heater as set forth in claim 25, wherein the composite further comprises a carrier sheet which forms at least part of the convective heat transfer surface.

27. An aircraft supplemental air heater as set forth in claim 26, wherein the carrier sheet is made of stainless steel, copper, copper alloy or aluminum.

28. A method of making the aircraft supplemental air heater comprising a coiled composite having a series of coil passes defining a spiral shaped airflow passage therebetween; the composite including a heating element providing a controlled heat output when a voltage potential is applied across it; the composite also including convective heat transfer surfaces to which the heat output is transferred whereby as air flows through the heater's spiral shaped airflow passage, it passes over the convective heat transfer surface and heat is thereby transferred to the air through convection;

said method comprising the steps of:

assembling a flat panel including the heating element, the panel having a length corresponding to a desired length of the composite, a width corresponding to the desired number of passes in the coil and the desired radial dimensions of the air passageways, and a thickness corresponding to the desired radial dimension of the coil passes; and forming the panel into a coiled shape;

wherein the step of assembling the panel comprises compiling:

a metal foil layer which is processed to form the heating element; and insulation layers which form insulation stratum.

29. A method as set forth in claim 28, wherein the step of compiling the layers comprises:

bonding the metal foil layer to one of the insulating layers;

etching the metal foil layer to form desired conductive paths corresponding to the heating element; and covering the etched foil layer with another one of the insulating layers to form an insulated etched foil layer.

30. A method as set forth in claim 29, wherein the step of forming the panel into the coiled shape comprises:

placing a spacer on the panel, the spacer having a thickness corresponding to the desired separation between the coil passes in the completed heater; and winding the panel and spacer into a coiled shape;

curing the panel so that it maintains the coiled shape; and removing the spacer.

31. A method as set forth in claim 30, wherein said step of compiling further comprises compiling a carrier layer which forms a carrier sheet and securing the insulated etched foil layer to the carrier sheet to form the panel.

32. An aircraft supplemental air heater comprising a coiled composite having a series of coil passes defining a spiral shaped airflow passage therebetween;

the composite including a heating element providing a controlled heat output when a voltage potential is applied across it;

the composite also including a carrier sheet; and the composite further including convective heat transfer surfaces to which the heat output is transferred whereby as air flows through the heater's spiral shaped airflow passage, it passes over the convective heat transfer surface and heat is thereby transferred to the air through convection.

33. An aircraft supplemental air heater as set forth in claim 32, wherein the carrier sheet is made of stainless steel, copper, copper alloy and/or aluminum.

34. An aircraft supplemental air heater comprising a coiled composite having a series of coil passes defining a spiral shaped airflow passage therebetween;

the composite including a heating element providing a controlled heat output when a voltage potential is applied across it;

the composite also including insulation layers between which the heating element is sandwiched; and the composite further including convective heat transfer surfaces to which the heat output is transferred whereby as air flows through the heater's spiral shaped airflow passage, it passes over the convective heat transfer surface and heat is thereby transferred to the air through convection.

35. An aircraft supplemental air heater comprising a coiled composite;

the composite including a heating element providing a controlled heat output when a voltage potential is applied across it, and insulation stratum placed within the composite between which the heating element is positioned;

the composite defining a series of coil passes which define a continuous spiral shaped airflow passage between the insulation stratum; and the composite further including convective heat transfer surfaces to which the heat output is transferred whereby, as air flows through the heater's spiral shaped airflow passage, it passes over the convective heat transfer surface and heat is thereby transferred to the air through convection.

36. An aircraft supplemental air heater as set forth in claim 35, wherein the radial separation between adjacent coil passes remains substantially constant, whereby the radial dimension of the coil-shaped passageways is approximately the same along the radial dimension of the heating element.

37. An aircraft supplemental air heater as set forth in claim 35, wherein the radial dimension of the coil passes is between 0.20–1.00 inches and wherein the heating element comprises an etched metal layer.

38. An aircraft supplemental air heater as set forth in claim 35, wherein the radial dimension of the coil passes is between 0.20–1.00 inches and wherein resistance wire is used to form the heating element.

* * * * *

UNITED STATES PATENT AND TRADEMARK OFFICE
CERTIFICATE OF CORRECTION

PATENT NO. : 6,592,075 B2 Page 1 of 1
DATED : July 15, 2003
INVENTOR(S) : Tommy M. Wilson, William A. Beard and Darryl W. Jones It is certified that error appears in the above-identified patent and that said Letters Patent is hereby corrected as shown below:

Column 8,
Line 66, after "element" insert -- and the insulation stratum --.

Signed and Sealed this

Fourteenth Day of December, 2004

JON W. DUDAS
*Director of the United States Patent and Trademark Office*